United States Patent
Chun et al.

(10) Patent No.: US 8,311,564 B2
(45) Date of Patent: Nov. 13, 2012

(54) GUARD BAND UTILIZATION IN MULTI-CARRIER MODE FOR WIRELESS NETWORKS

(75) Inventors: Joon Hwa Chun, Rockville, MD (US); Shashikant Maheshwari, Irving, TX (US); Shu-Shaw Wang, Arlington, TX (US); Zexian Li, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 373 days.

(21) Appl. No.: 12/575,625

(22) Filed: Oct. 8, 2009

(65) Prior Publication Data

US 2010/0093384 A1    Apr. 15, 2010

Related U.S. Application Data

(60) Provisional application No. 61/104,150, filed on Oct. 9, 2008.

(51) Int. Cl.
*H04B 7/00* (2006.01)
(52) U.S. Cl. .......... 455/509; 375/260
(58) Field of Classification Search .......... 455/509, 455/101, 450, 451, 452.1, 464; 375/260, 375/262, 265, 267; 370/329, 208, 210
See application file for complete search history.

(56) References Cited

U.S. PATENT DOCUMENTS

| | | | |
|---|---|---|---|
| 2005/0180314 A1* | 8/2005 | Webster et al. | 370/208 |
| 2008/0112308 A1 | 5/2008 | Cleveland | |
| 2010/0009691 A1* | 1/2010 | Choi et al. | 455/450 |

OTHER PUBLICATIONS

"Part 11: Wireless LAN Medium Access Control (MAC) and Physical Layer (PHY) Specifications", IEEE Standard for Information Technology—Telecommunications and information exchange between systems—Local and metropolitan area networks—Specific requirements, IEEE Computer Society, IEEE Std. 802.11—2007, Jun. 12, 2007, pp. 1-1232.

IEEE, "Part 16: Air Interface for Fixed Broadband Wireless Access Systems", IEEE Standard for Local and Metropolitan area Networks, IEEE Computer Society and the IEEE Microwave Theory and Techniques Society, IEEE New York, NY IEEE Std., IEEE Std 802.16—2004, Oct. 1, 2004, 893 pages.

Fu, I-Kang, et al, "Physical and Control Structure to Support Data Transmission/Reception over Guard Sub-carriers in IEEE 802.16m", IEEE 802.16m-08/1026 Broadband Wireless Access Working Group (Sep. 5, 2008), 12 pgs.

Hamiti, Shkumbin, "The Draft IEEE 802.16m System Description Document", IEEE 802.16m-08/003r5 Broadband Wireless Acess Working Group (Oct. 3, 2008), 122 pgs.

* cited by examiner

*Primary Examiner* — Nay A Maung
*Assistant Examiner* — Angelica Perez
(74) *Attorney, Agent, or Firm* — Brake Hughes Bellermann LLP (57) ABSTRACT

Various example embodiments are disclosed herein. According to an example embodiment, an apparatus may include a processor which may be configured to: permute subcarriers of a regular band, including subcarriers assigned to mobile station(s) operating in a single carrier mode and subcarriers assigned to mobile station(s) operating in a multiple carrier mode, to generate a first permuted regular band of subcarriers; and permute subcarriers of the first permuted regular band that are assigned to mobile station(s) operating in multiple carrier mode with subcarriers of an adjacent guard band.

19 Claims, 9 Drawing Sheets

200
First Stage of Subcarrier (or Subcarrier Index) Permutation

300
Example 10f
Second Stage of
Subcarrier (or
Subcarrier Index)
Permutation

400
Example 2 0f
Second Stage of
Subcarrier (or
Subcarrier Index)
Permutation

GUARD BAND UTILIZATION IN MULTI-CARRIER MODE FOR WIRELESS NETWORKS

PRIORITY CLAIM

This application claims priority to U.S. Provisional application Ser. No. 61/104,150, filed on Oct. 9, 2008, entitled "Guard Band Utilization in Multi-Carrier Mode for Wireless Networks," hereby incorporated by reference.

TECHNICAL FIELD

This description relates to wireless networks.

BACKGROUND

Some wireless networks may support users or mobile stations that transmit using one carrier, or via multiple carriers. Also, distributed subchannelization mode may include permuting subcarrier indices in a frequency band, which may improve frequency diversity among users or mobile stations.

SUMMARY

According to an example embodiment, an apparatus may include a processor which may be configured to: permute subcarriers of a regular band, including subcarriers assigned to mobile station(s) operating in a single carrier mode and subcarriers assigned to mobile station(s) operating in a multiple carrier mode, to generate a first permuted regular band of subcarriers; and permute subcarriers of the first permuted regular band that are assigned to mobile station(s) operating in multiple carrier mode with subcarriers of an adjacent guard band.

According to another example embodiment, a method may include permuting subcarriers of a regular band, including subcarriers assigned to mobile station(s) operating in a single carrier mode and subcarriers assigned to mobile station(s) operating in a multiple carrier mode, to generate a first permuted regular band of subcarriers, and permuting subcarriers of the first permuted regular band that are assigned to mobile station(s) operating in multiple carrier mode with subcarriers of an adjacent guard band.

According to another example embodiment, an apparatus may include a processor configured to: permute subcarrier indices of a regular band of subcarriers, including subcarriers assigned to mobile station(s) operating in a single carrier mode and subcarriers assigned to mobile station(s) operating in a multiple carrier mode, to generate a first permuted regular band of subcarrier indices; and permute subcarrier indices of the first permuted regular band of subcarriers that are assigned to mobile station(s) operating in multiple carrier mode with subcarrier indices of an adjacent guard band of subcarriers to generate a set physical subcarrier indices.

According to another example embodiment, a method is disclosed for performing a two-stage subcarrier index permutation for a wireless network. The method may include permuting subcarrier indices of a regular band of subcarriers, including subcarriers assigned to mobile station(s) operating in a single carrier mode and subcarriers assigned to mobile station(s) operating in a multiple carrier mode, to generate a first permuted regular band of subcarrier indices; and permuting subcarrier indices of the first permuted regular band of subcarriers that are assigned to mobile station(s) operating in multiple carrier mode with subcarrier indices of an adjacent guard band of subcarriers.

According to an example embodiment, an apparatus may include a processor configured to: permute subcarrier indices within a first regular band of subcarriers to generate a first permuted regular band of subcarrier indices; permute subcarrier indices within a second regular band of subcarriers to generate a second permuted regular band of subcarrier indices, wherein a guard band of subcarriers is adjacent to both the first regular band of subcarriers and the second regular band of subcarriers, and wherein both the permuting subcarrier indices within the first regular band and the permuting subcarrier indices within the second regular band excludes the guard band subcarriers; and permute subcarrier indices of the guard band of subcarriers and subcarrier indices of both the first permuted regular band of subcarriers and the second permuted regular band of subcarriers that are assigned to mobile station(s) operating in multiple carrier mode.

According to another example embodiment, a method may include permuting subcarrier indices within a first regular band of subcarriers to generate a first permuted regular band of subcarrier indices; permuting subcarrier indices within a second regular band of subcarriers to generate a second permuted regular band of subcarrier indices, wherein a guard band of subcarriers is adjacent to both the first regular band of subcarriers and the second regular band of subcarriers, and wherein both the permuting subcarrier indices within the first regular band and the permuting subcarrier indices within the second regular band excludes the guard band subcarriers.

According to another example embodiment, a method may include permuting a plurality of regular band physical resource units to generate a plurality of logical resource units; permuting subcarriers of one or more of the regular band logical resource units with subcarriers of one or more guard band physical resource units to generate one or more logical distributed resource units; and sending a message to allocate one or more of the logical distributed resource units to one or more mobile stations operating in a multicarrier mode.

According to another example embodiment, an apparatus may include a processor. The processor may be configured to permute a plurality of regular band physical resource units to generate a plurality of logical resource units; permute subcarriers of one or more of the regular band logical resource units with subcarriers of one or more guard band physical resource units to generate one or more logical distributed resource units; and generate a message for transmission to allocate one or more of the logical distributed resource units to one or more mobile stations operating in a multicarrier mode.

The details of one or more implementations are set forth in the accompanying drawings and the description below. Other features will be apparent from the description and drawings, and from the claims.

DETAILED DESCRIPTION

Figure 1:
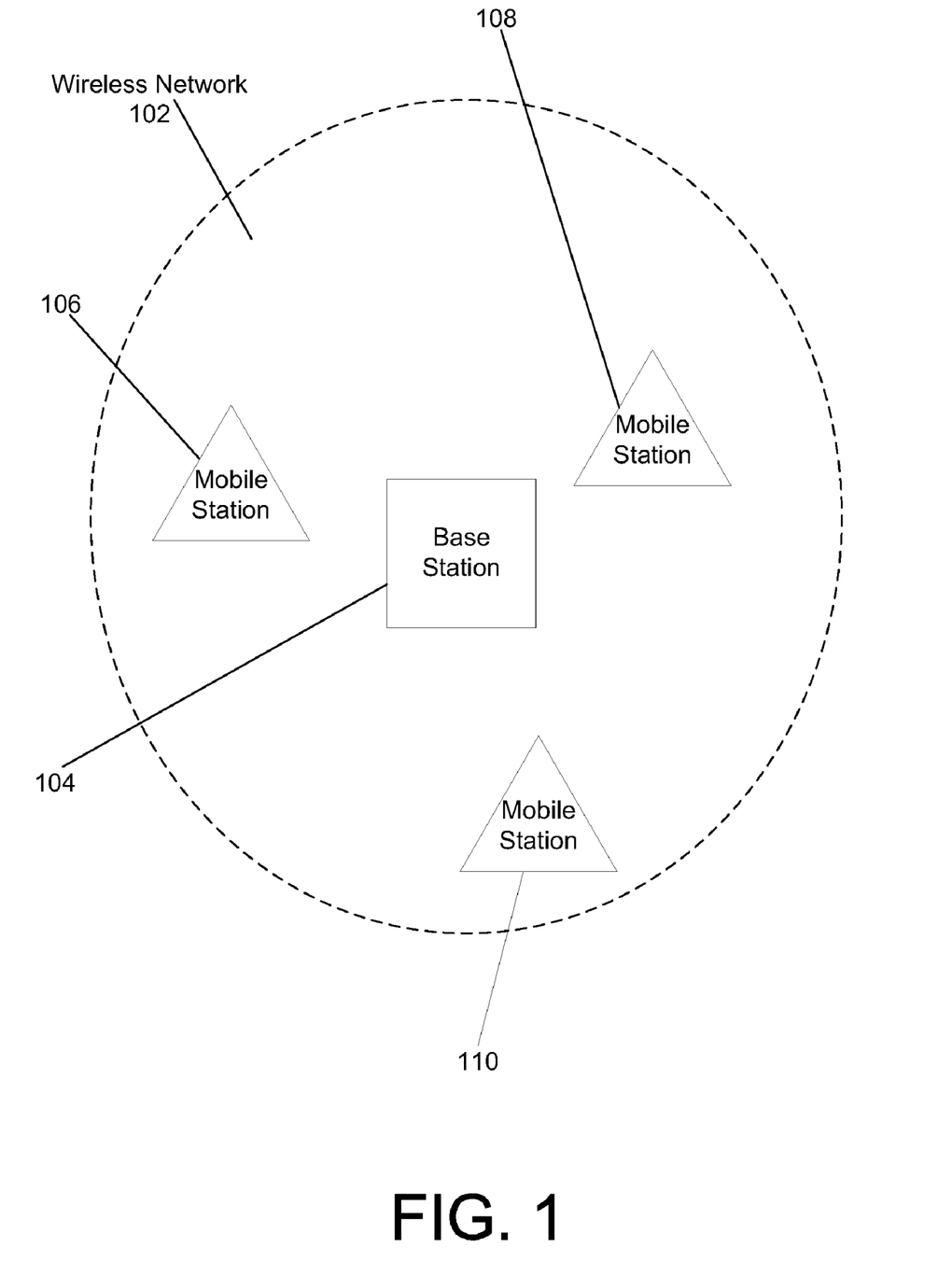
FIG. 1 is a block diagram of a wireless network according to an example embodiment.

FIG. 1 is a block diagram of a wireless network 102 including a base station 104 and three mobile stations 106, 108, 110 according to an example embodiment. Although not shown, mobile stations 106, 108 and 110 may be coupled to base station 104 via relay stations or relay nodes, for example. The wireless network 102 may include, for example, an IEEE 802.16 Wireless Metropolitan Area Network (WiMAX), an IEEE 802.11 Wireless Local Area Network (WLAN), or a cellular telephone network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" may include any type of wireless node, such as base stations, mobile stations, etc. While the present disclosure may use some of the terminology of WiMAX or other wireless standards, aspects of the present disclosure may be applicable to any networking or wireless technologies.

According to an example embodiment, one or more carriers (or carrier frequencies) may be used to transmit signals or data. Each carrier may have a number of regular (or used) subcarriers modulated thereon, for example, that may be used for transmission of data or signals. A regular band of subcarriers may be provided within a specific bandwidth for the regular band. A guard band may also be provided and may include (or include the possibility of) one or more guard band subcarriers, which (at least in some cases) may remain unused, since the guard band may act as a buffer or separate two regular bands.

In some types of wireless systems, mobile stations may operate in either a single carrier mode in which the MS (mobile station) may use subcarriers of one carrier or regular band, or in multicarrier mode in which a MS may use subcarriers (or resources) within two separate regular bands (or from two carriers). The subcarriers or resources used from two different regular bands or carriers may provide increased resources for the MS to transmit and/or receive data or messages.

Mobile stations operating in multicarrier mode may be provided with two types of radio (or wireless) spectrum: non-aggregated, and aggregated. With an aggregated spectrum, the MS may (at least in some cases) use the guard band located between the two regular bands that are part of the aggregated spectrum, which may further increase the capacity, e.g., by providing one or more additional subcarriers for transmitting and/or receiving data or messages. This is because the guard band is not necessary to separate the two regular bands for the MS operating in multicarrier mode, e.g., for an aggregated spectrum.

According to an example embodiment, according to distributed subchannelization (as an example), a group of subcarriers in a frequency band may be permuted (by permutation procedure), in which the order or arrangement or sequence of the subcarriers may be changed. Each subcarrier may have an index that may be associated with a specific subcarrier frequency. For example, by permuting subcarriers (or subcarrier indices) for two or more users or MSs within a frequency band, the subcarriers for each user or MS may become more distributed throughout the frequency band, instead of being grouped together, e.g., as a consecutive or contiguous group of subcarriers. Thus, permutation of subcarriers (or subcarrier indexes) may improve frequency diversity gain.

Various embodiments or techniques are described herein to perform subcarrier permutation in the case where at least one MS is operating in multicarrier mode. According to an example embodiment, a two-stage permutation may be performed, including a first permutation stage that may include permuting subcarriers of a regular band, including subcarriers assigned to mobile station(s) operating in a single carrier mode and subcarriers assigned to mobile station(s) operating in a multiple carrier mode, to generate a first permuted regular band of subcarriers; and, a second permutation stage that may include permuting subcarriers of the first permuted regular band that are assigned to mobile station(s) operating in multiple carrier mode with subcarriers of an adjacent guard band.

Figure 2:
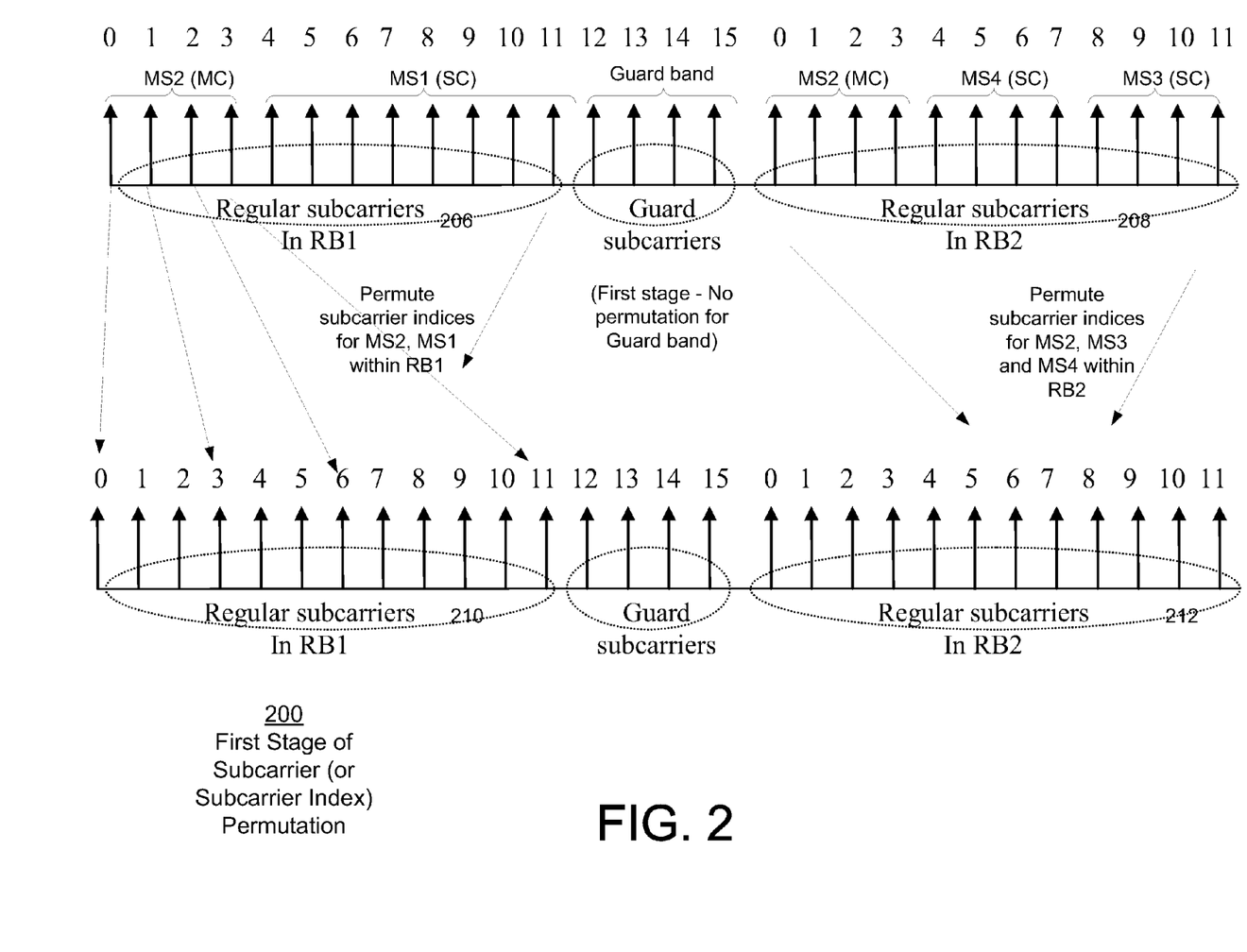
FIG. 2 is a diagram illustrating operation of a first permutation stage according to an example embodiment.

FIG. 2 is a diagram illustrating operation of a first permutation stage according to an example embodiment. Three bands are shown including a first regular band (RB) 1 having regular subcarriers with indices 0-11, a guard band having guard band subcarriers with indices 12-15, and a second regular band (RB) 2 having regular subcarriers 0-11. RB1 may provide the subcarriers on a first carrier, and RB2 may provide subcarriers on a second carrier, with a guard band that separates and is adjacent to RB1 and RB2.

As shown in this example, the regular subcarriers are allocated to four mobile stations. Regular subcarriers 0-3 of RB1 are assigned to MS2 (mobile station 2), which is operating in a multicarrier (MC) mode. Regular subcarriers 4-11 of RB1 are assigned to MS1, which is operating in a single carrier mode. Regular subcarriers 0-3 of RB2 are also assigned to MS2 (MS2 has subcarriers from two adjacent regular bands, RB1, and RB2). Regular subcarriers 4-7 of RB2 are assigned to MS4 which is operating in a single carrier mode, and regular subcarriers 8-11 of RB2 are assigned to MS3 which also operates in single carrier mode.

In this first stage of permutation, permutation is performed on the regular (non-guard band) subcarriers independently within each regular band. Thus, as shown in FIG. 2, this stage may include permuting subcarrier indices (or subcarriers) within a first regular band (RB1) 206 of subcarriers to generate a first permuted regular band 210 of subcarrier indices. This first stage may also include permuting subcarrier indices within a second regular band (RB2) 208 of subcarriers to generate a second permuted regular band 212 of subcarrier indices. In an example embodiment, the guard band of subcarriers is adjacent to both the first regular band of subcarriers and the second regular band of subcarriers. Also, both the permuting subcarrier indices within the first regular band (RB1) and the permuting subcarrier indices within the second regular band (RB2) excludes the guard band subcarriers (does not permute with guard band subcarriers), in this permutation stage. This first permutation stage operates to permute (or permutate) the regular subcarriers of different users or mobile stations, which may improve frequency diversity for these mobile stations, for example.

According to an example embodiment, a second permutation stage (which follows the first stage) may be performed, which may include permuting the guard band subcarriers with the permuted regular subcarriers (which were permuted in first permutation stage) that are assigned to a mobile station operating in multicarrier mode. In FIG. 2 example, only MS2 is operating in multicarrier mode. Thus, in the example of FIG. 2, the guard band subcarrier indices may be permuted with the regular subcarriers having indices 0, 3, 6, and 11 (from permuted RB1 210), which are assigned to MS2. Similarly, the guard band subcarriers (or subcarrier indices) may be permuted with the regular subcarriers of the permuted second regular band RB2 212. Or, the guard band subcarriers (or subcarrier indices) may be permuted with all the multi-carrier subcarriers (or subcarrier indices), including the regular subcarriers assigned to MS2 in both permuted RB1 210 and permuted RB2 212.

Thus, by providing a two stage permutation, this may allow subcarriers of both single carrier MSs and multiple carrier MSs to be permuted in a first stage, and allowing the guard band subcarriers to be permuted only with the previously permuted subcarriers assigned to a multicarrier MS in a second stage. By permuting the guard band only with regular subcarriers assigned to multiple carrier BSs, the second permutation stage does not affect or change the index or position of the regular subcarriers assigned to single carrier MSs in the second stage. This may allow, for example, for a distributed subchannelization, for one or more multicarrier MSs (MSs operating in a multicarrier mode) to use or make use of the guard band subcarriers (in an adjacent guard band) to increase capacity, without impacting single carrier MSs (e.g., not permuting, in the second permutation stage, regular subcarrier indices of subcarriers assigned to MSs operating in a single carrier mode). For example, the BS may transmit or receive data or signals to or from the MS2 (and the MS2 may transmit and receive signals from the BS) via a group of resources that may include its regular subcarriers from RB1 and RB2, and also the guard band subcarriers, for example.

Thus, according to an example embodiment, the techniques described herein may provide for a guard band subcarrier utilization for distributed subchannelization mode (e.g., for IEEE 802.16 or for IEEE 802.16m). A two stage permutation may be performed to utilize the guard band subcarriers in a fully distributed subchannelization mode. Thus, as noted above, a first permutation stage may perform permutation on regular subcarriers, e.g., independently within each regular band. Guard subcarriers are excluded from the permutation of this first stage, e.g., which may avoid a conflict or confliction of subcarrier indices between single carrier MSs and multiple carrier MSs. The first permutation stage may be followed by a second permutation stage in which the regular permuted subcarriers from the first stage (e.g., from permuted regular band 210 and/or 212) that are assigned to multiple carrier MSs are permuted with the guard band subcarriers.

Further details of the second permutation stage will now be described, according to one or more example embodiments. Let P represent the permuted indices of regular subcarriers for multiple carrier MSs or user(s) within aggregated spectrum (such as P subcarriers within RB1 210 and/or RB2 212), $P=\{p_0, p_1, \ldots, p_{N-1}\}$ where N is the total number of regular subcarriers which are allocated to the multiple carrier MSs who will utilize guard band subcarriers. Let G denote the guard band subcarrier indices, $G=\{g_0, g_1, \ldots, g_{M-1}\}$, and M is the total number of guard subcarriers that are belong to the same multiple carrier user(s) or MS(s). Define $S=\{s_0, s_1, \ldots, s_{T-1}\}$ as the physical subcarrier indices for the MC user(s) resulting from second permutation stage, where T=N+N1, where N is an integer multiple of N1 and $$N1 = \left\lfloor \frac{N}{M} \right\rfloor \times M.$$

Note that $\lfloor . \rfloor$ denote the floor operation. Define $$\lambda = \frac{N}{M}$$

and assume that $\lambda \geq 1$.

Note that both P and G represent sets of physical subcarrier indices however P is the set of permuted indices from first stage permutation, and G is the set of guard band subcarrier indices which are not permuted in the first permutation stage.

In an example embodiment, to decrease the additional complexity and overheads due to second permutation stage, a simple but relative efficient permuting operation may be used, for example. The second permutation stage may be performed based on Eqn. (1) as follows:

$$I) s_{(\lambda+1)\times m} = g_m, m=0,1,\ldots,M-1.$$

$$II) s_i = p_n, i=1,2,\ldots,\lambda,\lambda+2,\ldots,2\lambda+1,2\lambda+3,\ldots,T-1,$$
$$n=0,1,\ldots,N-1. \quad (1)$$

Thus, the second permutation stage may include permuting subcarrier indices of the first permuted regular band of subcarriers that are assigned to mobile station(s) operating in multiple carrier mode with subcarrier indices of an adjacent guard band of subcarriers. As can be seen from Eqn. (1), this second permutation stage may include operations from I and II of Eqn. (1), for example:

From I of Eqn. (1), placing (or inserting) guard band subcarriers at subcarrier locations (or subcarrier indices) at a regular interval or spacing of subcarriers based on the ratio of N/M, where N is a number of subcarriers in the first permuted regular band that are assigned to mobile station(s) operating in the multiple carrier mode and M is a number of guard band subcarriers. In this example, the guard band subcarriers may be placed or inserted at a regular interval or spacing of $\lambda+1$ subcarrier indices. E.g., for $\lambda=2$, the guard band subcarriers may be inserted every three subcarriers, e.g., at subcarrier indices 0, 3, 6, 9, according to this simple example.

From II of Eqn. (1), placing (or inserting) regular subcarriers of the first permuted regular band (e.g., subcarriers from 210 assigned to multiple carrier BSs) at subcarrier locations (or subcarrier indices) at locations not taken by the guard band subcarriers. Thus, in II, certain subcarrier locations or positions or subcarrier indices are skipped (such as $\lambda+1$, $2\lambda+2$, etc.) since these skipped positions or locations or subcarrier indices are (or may) already be filled by guard band subcarriers based on I of Eqn. (1).

According to one example embodiment, in the second permutation stage, the guard band subcarriers may be permuted with regular subcarriers of only one regular band. This example embodiment is relatively simple and is illustrated and explained in more detail with reference to FIG. 3.

According to another example embodiment, in the second permutation stage, the guard band subcarriers may be permuted with regular subcarriers across an aggregated band or aggregated spectrum or bandwidth, e.g., permute guard band subcarriers with regular subcarriers of both permuted RB1 and permuted RB2, for example. This second example embodiment of the second permutation stage is illustrated and explained in greater detail in FIG. 4, according to an example embodiment. The second example embodiment is more complex than the first example embodiment, and may offer increased frequency diversity, since the permutation may occur over the entire aggregated bandwidth. It should be noted that for the second example embodiment, renumbering of subcarrier indices situated in certain RB may be performed or required, e.g., to avoid a subcarrier index number conflict with the other RB (e.g., since both RBs or guard band may have independently numbered indices).

Figure 3:
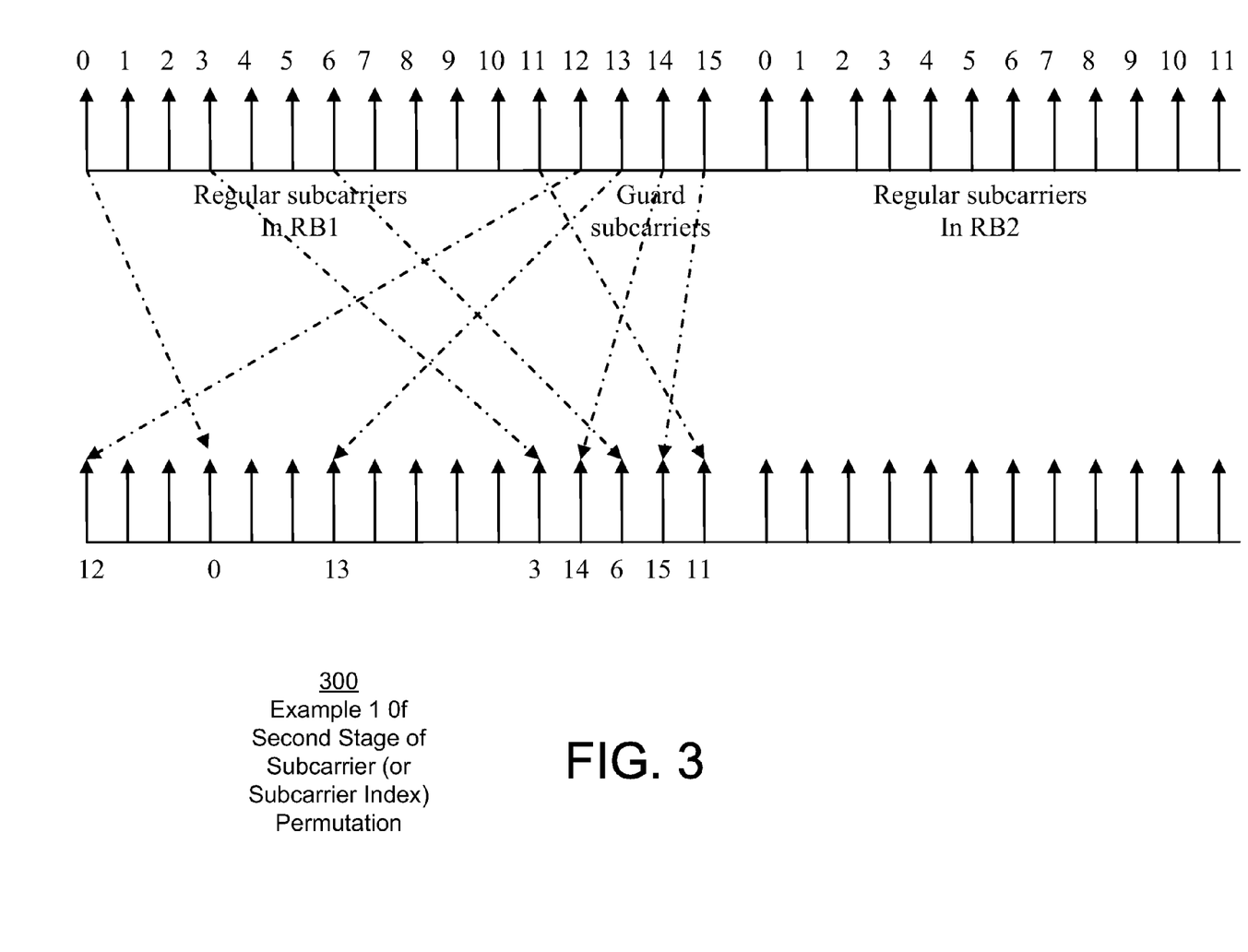
FIG. 3 is a diagram illustrating operation of a second permutation stage according to an example embodiment.

FIG. 3 is a diagram illustrating a second permutation stage according to an example embodiment. In this example embodiment, regular subcarriers assigned to a multiple carrier user/BS from only one regular band (e.g., RB1 in this example) are permuted with the guard band subcarriers. In this example, the regular subcarriers from permuted RB1 210 that are assigned to an MS that is operating in multiple carrier mode (e.g., assigned to MS2) are permuted with the guard band subcarriers. Or, in other words, the subcarrier indices from permuted RB1 210 for subcarriers that are assigned to an MS that is operating in multiple carrier mode (e.g., assigned to MS2) are permuted with the guard band subcarrier indices. In an example embodiment, two RF carriers RF1 and RF1 are provided in a bandwidth RB1 and RB2, which are aggregated to form a continuous or aggregated spectrum for multiple carrier (or multicarrier) support.

FIG. 2 shows one example of the resulted physical subcarrier indices from first permutation stage performed within RB1 and RB2. The permuted physical subcarrier indices for MS2 within RB 1 are given as $P=\{p_0, p_1, p_2, p_3\}$, where $p_0=0$, $p_1=3$, $p_2=6$, and $p_4=11$ and the guard subcarrier indices for MS2 are $G=\{g_0, g_1, g_2, g_3\}$ where $g_0=12$, $p_1=13$, $p_2=14$, and $p_4=15$. As noted, MS2 is operating in multiple carrier mode. For this example, previously defined parameters become $N=4$, $M=4$, and $\lambda=1$. After the second permutation stage is performed given by Eqn. (1), as shown in FIG. 3, the resultant permuted indices can be given as $S=\{12,0,13,3,14,6,15,11\}$, which includes four subcarriers from RB1 and four guard band sub carriers.

Figure 4:
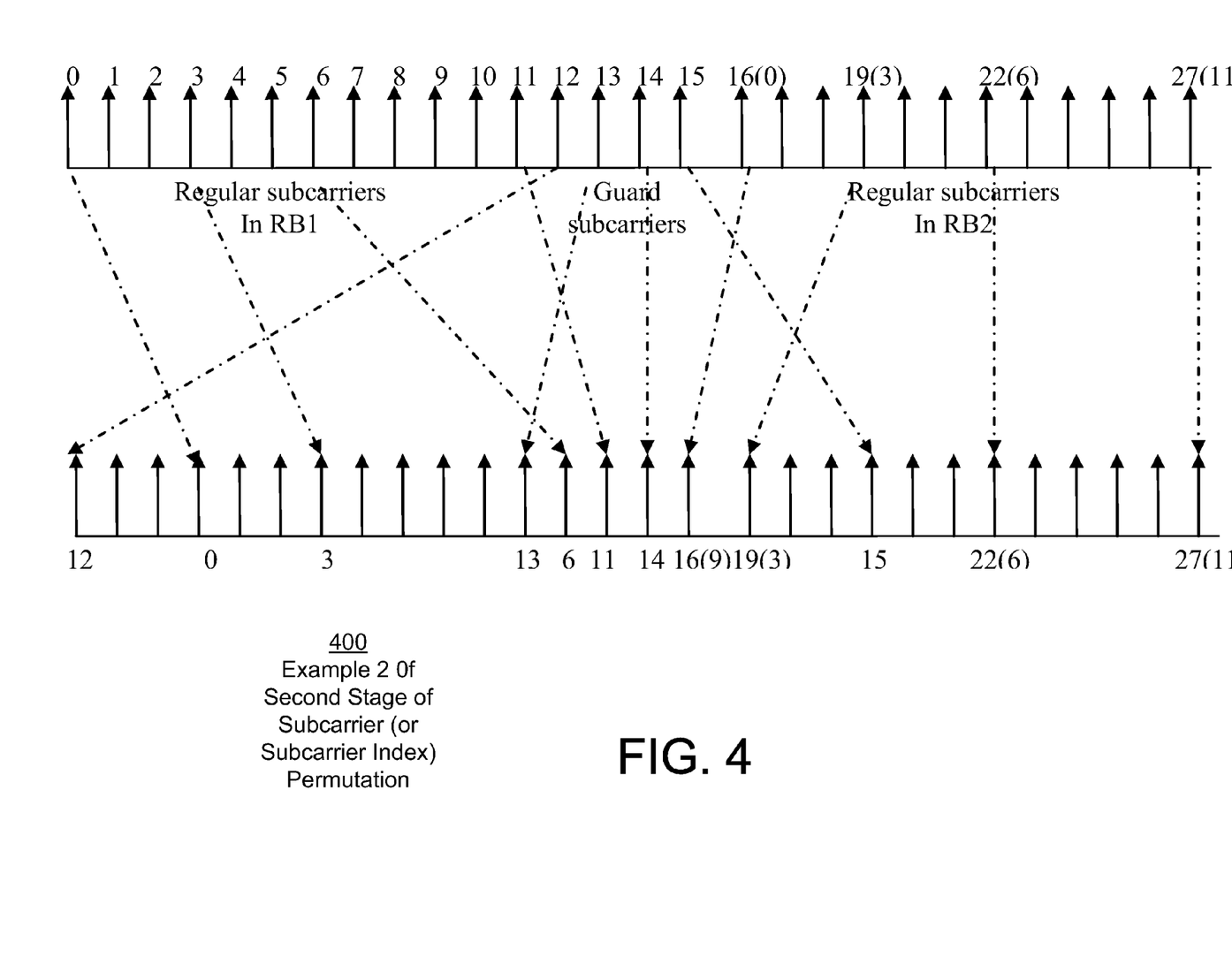
FIG. 4 is a diagram illustrating operation of a second permutation stage according to another example embodiment.

FIG. 4 is a diagram illustrating a second permutation stage according to another example embodiment. In this example, the guard band subcarriers (or guard band subcarrier indices) are permuted with subcarriers (or subcarrier indices) from both the first and the second permuted resources blocks RB1 (210) and RB2 (212) for subcarriers assigned to MSs operating in multiple carrier (multicarrier) mode. Thus, in this example, improved frequency diversity may be obtained for the guard band subcarriers since the guard band subcarriers are permuted across the full aggregated band or spectrum (e.g., guard band subcarriers permuted with both RB1 and RB2). The subcarrier indices of one of the RBs, e.g., RB2, should be renumbered to avoid a numbering conflict with the indices of RB1 and the guard band, since this may be considered by MS2 to be one spectrum.

As shown in FIG. 4, in this second example of the second permutation stage, permutation may be performed between subcarrier indices of RB1, guard band, and RB2, for example. In this case, the parameters are, $N=8$, $M=4$, and $\lambda=2$. After the permutation, the physical subcarrier indices of regular band are given as $P=\{p_0, p_1, p_2, p_3, p_4, p_5, p_6, p_7\}$, where $p_0=0$, $p_1=3$, $p_2=6$, $p_3=11$, $p_4=16$, $p_5=19$, $p6=22$, and $p_7=27$. Note that $p_4$, $p_5$, $p_6$, and $p_7$ are renumbered. Through Eqn. (1), the second permuted indices for MS2 are given as $S=\{12,0,3,13, 6,11,14,16,19,15,22,27\}$, which includes four subcarriers from RB1, four subcarriers from guard band, and four subcarriers from RB2, although in a permuted (or changed) arrangement or order.

According to an example embodiment, an apparatus may include a processor which may be configured to: permute subcarriers of a regular band, including subcarriers assigned to mobile station(s) operating in a single carrier mode and subcarriers assigned to mobile station(s) operating in a multiple carrier mode, to generate a first permuted regular band of subcarriers; and permute subcarriers of the first permuted regular band that are assigned to mobile station(s) operating in multiple carrier mode with subcarriers of an adjacent guard band.

In an example embodiment, the processor being configured to permute subcarriers of the first permuted regular band that are assigned to mobile station(s) operating in multiple carrier mode with subcarriers of an adjacent guard band may include the processor being configured to: place guard band subcarriers at subcarrier locations (or subcarrier indices) at a regular interval or spacing of subcarriers; and place subcarriers of the first permuted regular band at subcarrier locations (or subcarrier indices) at locations not taken by the guard band subcarriers.

In an example embodiment, the processor being configured to permute subcarriers of the first permuted regular band that are assigned to mobile station(s) operating in multiple carrier mode with subcarriers of an adjacent guard band may include the apparatus being configured to: place guard band subcarriers at subcarrier locations (or subcarrier indices) at a regular interval or spacing of subcarriers based on the ratio of N/M, where N is a number of subcarriers in the first permuted regular band that are assigned to mobile station(s) operating in the multiple carrier mode and M is a number of guard band subcarriers; and place subcarriers of the first permuted regular band at subcarrier locations (or subcarrier indices) at locations not taken by the guard band subcarriers.

In an example embodiment, the processor being configured to place guard band subcarriers at subcarrier locations may include the processor being configured to place guard band subcarriers at subcarrier locations (or subcarrier indices) at a regular interval or spacing of $(\lambda+1)$ subcarriers, where $\lambda=N/M$, where N is a number of subcarriers in the first permuted regular band that are assigned to mobile station(s) operating in the multiple carrier mode and M is a number of guard band subcarriers.

In an example embodiment, the processor being configured to permute subcarriers of the first permuted regular band that are assigned to mobile station(s) operating in multiple carrier mode with subcarriers of an adjacent guard band may include the processor being configured to: place guard band subcarriers at subcarrier locations (or subcarrier indices) at a regular interval or spacing of subcarriers based on $s_{(\lambda+1)\times m}=g_m$, $m=0, 1, \ldots, M-1$, where s are the resulting permuted subcarrier indices $\lambda=N/M$, where N is a number of subcarriers in the first permuted regular band that are assigned to mobile station(s) operating in the multiple carrier mode and M is a number of guard band subcarriers, and $g_m$ are the guard band subcarriers; and place subcarriers of the first permuted regular band at subcarrier locations (or subcarrier indices) at locations not taken by the guard band subcarriers based on $s_i=p_n$, $i=1, 2, \ldots, \lambda, \lambda+2, \ldots, 2\lambda+1, 2\lambda+3, \ldots, T-1$, $n=0, 1, \ldots, N-1$, where s are the resulting permuted subcarrier indices, and p are the subcarrier indices of subcarriers assigned to mobile station(s) operating in multiple carrier mode of the first permuted regular band of sub carriers.

Figure 5:
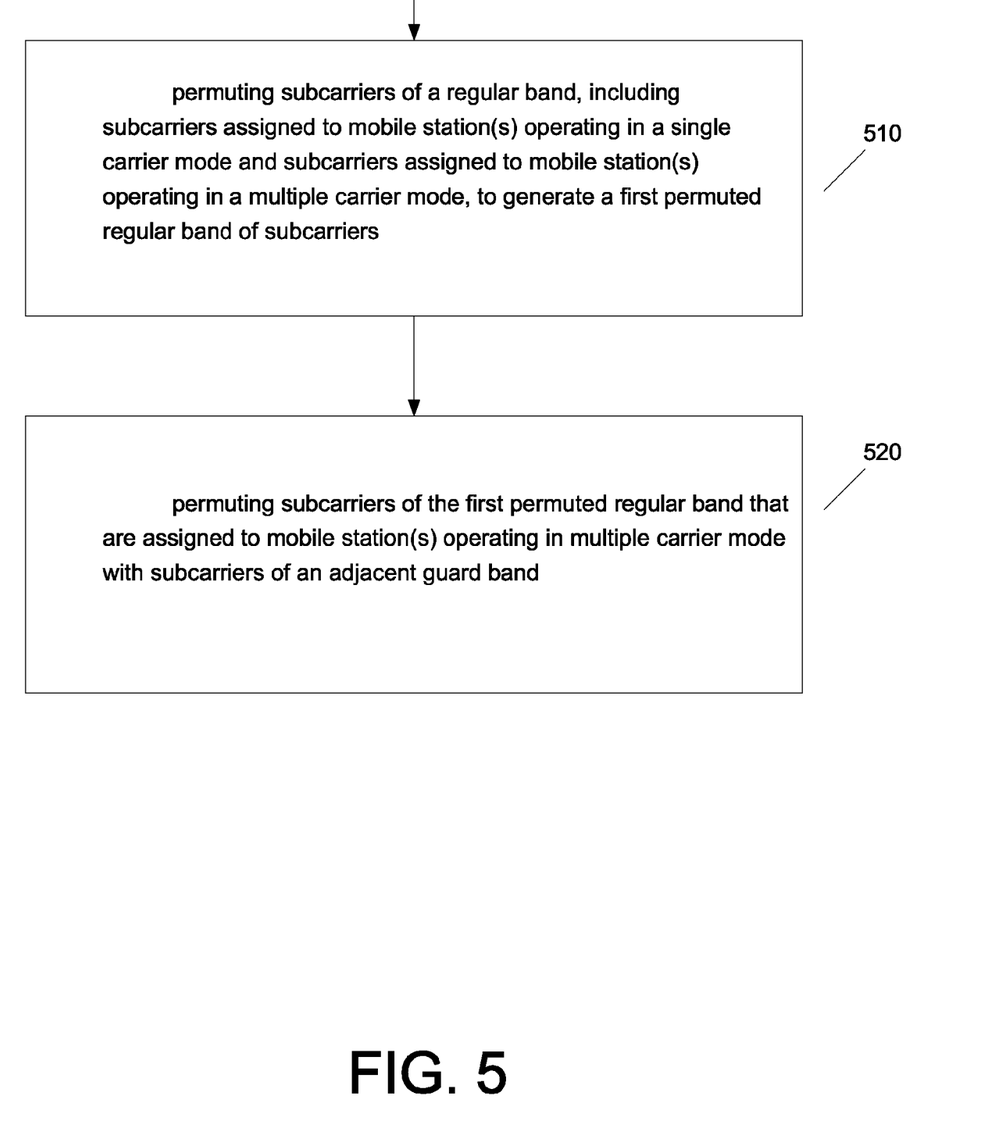
FIG. 5 is a flow chart illustrating operation of a wireless node according to an example embodiment.

FIG. 5 is a flow chart illustrating operation of a wireless node according to an example embodiment. Operation 510 may include permuting subcarriers of a regular band, including subcarriers assigned to mobile station(s) operating in a single carrier mode and subcarriers assigned to mobile station(s) operating in a multiple carrier mode, to generate a first permuted regular band of subcarriers. Operation 520 may include permuting subcarriers of the first permuted regular band that are assigned to mobile station(s) operating in multiple carrier mode with subcarriers of an adjacent guard band.

In an example embodiment, operation 520 may include placing guard band subcarriers at subcarrier locations (or subcarrier indices) at a regular interval or spacing of subcarriers; and placing subcarriers of the first permuted regular band at subcarrier locations (or subcarrier indices) at locations not taken by the guard band subcarriers.

In an example embodiment, operation 520 may include placing guard band subcarriers at subcarrier locations (or subcarrier indices) at a regular interval or spacing of subcarriers based on the ratio of N/M, where N is a number of subcarriers in the first permuted regular band that are assigned to mobile station(s) operating in the multiple carrier mode and M is a number of guard band subcarriers; and placing subcarriers of the first permuted regular band at subcarrier locations (or subcarrier indices) at locations not taken by the guard band subcarriers.

In an example embodiment, the placing guard band subcarriers at subcarrier locations may include placing guard band subcarriers at subcarrier locations (or subcarrier indices) at a regular interval or spacing of ($\lambda$+1) subcarriers, where $\lambda$=N/M, where N is a number of subcarriers in the first permuted regular band that are assigned to mobile station(s) operating in the multiple carrier mode and M is a number of guard band subcarriers.

In an example embodiment, operation 520 may include placing guard band subcarriers at subcarrier locations (or subcarrier indices) at a regular interval or spacing of subcarriers based on $s_{(\lambda+1) \times m} = g_m$, m=0, 1, . . . , M−1, where s are the resulting permuted subcarrier indices, $\lambda$=N/M, where N is a number of subcarriers in the first permuted regular band that are assigned to mobile station(s) operating in the multiple carrier mode and M is a number of guard band subcarriers, and $g_m$ are the guard band subcarriers; and placing subcarriers of the first permuted regular band at subcarrier locations (or subcarrier indices) at locations not taken by the guard band subcarriers based on $s_i = p_n$, i=1, 2, . . . , $\lambda$, $\lambda$+2, . . . , 2$\lambda$+1, 2$\lambda$+3, . . . , T−1, n=0, 1, . . . , N−1, where s are the resulting permuted subcarrier indices, and p are the subcarrier indices of subcarriers assigned to mobile station(s) operating in multiple carrier mode of the first permuted regular band of subcarriers.

According to another example embodiment, an apparatus may include a processor configured to: permute subcarrier indices of a regular band of subcarriers, including subcarriers assigned to mobile station(s) operating in a single carrier mode and subcarriers assigned to mobile station(s) operating in a multiple carrier mode, to generate a first permuted regular band of subcarrier indices; and permute subcarrier indices of the first permuted regular band of subcarriers that are assigned to mobile station(s) operating in multiple carrier mode with subcarrier indices of an adjacent guard band of subcarriers to generate a set physical subcarrier indices.

In an example embodiment, the processor being configured to permute subcarrier indices of the first permuted regular band of subcarriers that are assigned to mobile station(s) operating in multiple carrier mode with subcarrier indices of an adjacent guard band of subcarriers may include the apparatus being configured to: place guard band subcarriers at subcarrier locations (or subcarrier indices) at a regular interval or spacing of subcarriers; and place subcarriers of the first permuted regular band at subcarrier locations (or subcarrier indices) at locations not taken by the guard band subcarriers.

In an example embodiment, the processor being configured to permute subcarrier indices of the first permuted regular band of subcarriers that are assigned to mobile station(s) operating in multiple carrier mode with subcarrier indices of an adjacent guard band of subcarriers may include the apparatus being configured to: place guard band subcarriers at subcarrier locations (or subcarrier indices) at a regular interval or spacing of subcarriers based on the ratio of N/M, where N is a number of subcarriers in the first permuted regular band that are assigned to mobile station(s) operating in the multiple carrier mode and M is a number of guard band subcarriers; and place subcarriers of the first permuted regular band at subcarrier locations (or subcarrier indices) at locations not taken by the guard band subcarriers.

In an example embodiment, the processor being configured to place guard band subcarriers at subcarrier locations (or subcarrier indices) may include the processor being configured to place guard band subcarriers at subcarrier locations (or subcarrier indices) at a regular interval or spacing of ($\lambda$+1) subcarriers, where $\lambda$=N/M, where N is a number of subcarriers in the first permuted regular band that are assigned to mobile station(s) operating in the multiple carrier mode and M is a number of guard band subcarriers.

In an example embodiment, the processor may be configured to permute subcarrier indices of the first permuted regular band of subcarriers that are assigned to mobile station(s) operating in multiple carrier mode with subcarrier indices of an adjacent guard band of subcarriers may include the apparatus being configured to: place guard band subcarriers at subcarrier locations (or subcarrier indices) at a regular interval or spacing of subcarriers based on $s_{(\lambda+1) \times m} = g_m$, m=0, 1, . . . , M−1, where s are the resulting permuted subcarrier indices, $\lambda$=N/M, where N is a number of subcarriers in the first permuted regular band that are assigned to mobile station(s) operating in the multiple carrier mode and M is a number of guard band subcarriers, and $g_m$ are the guard band subcarriers; and place subcarriers of the first permuted regular band at subcarrier locations (or subcarrier indices) at locations not taken by the guard band subcarriers based on $s_i = p_n$, i=1, 2, . . . , $\lambda$, $\lambda$+2, . . . , 2$\lambda$+1, 2$\lambda$+3, . . . , T−1, n=0, 1, . . . , N−1, where s are the resulting permuted subcarrier indices, and p are the subcarrier indices of subcarriers assigned to mobile station(s) operating in multiple carrier mode of the first permuted regular band of subcarriers.

In an example embodiment, the processor may be further configured to generate a message for wireless transmission that allocates one or more subcarriers to a mobile station from the set physical subcarrier indices.

In an example embodiment, the processor may be further configured to transmit or receive data via wireless transmission via one or more subcarriers based on the set physical subcarrier indices.

Figure 6:
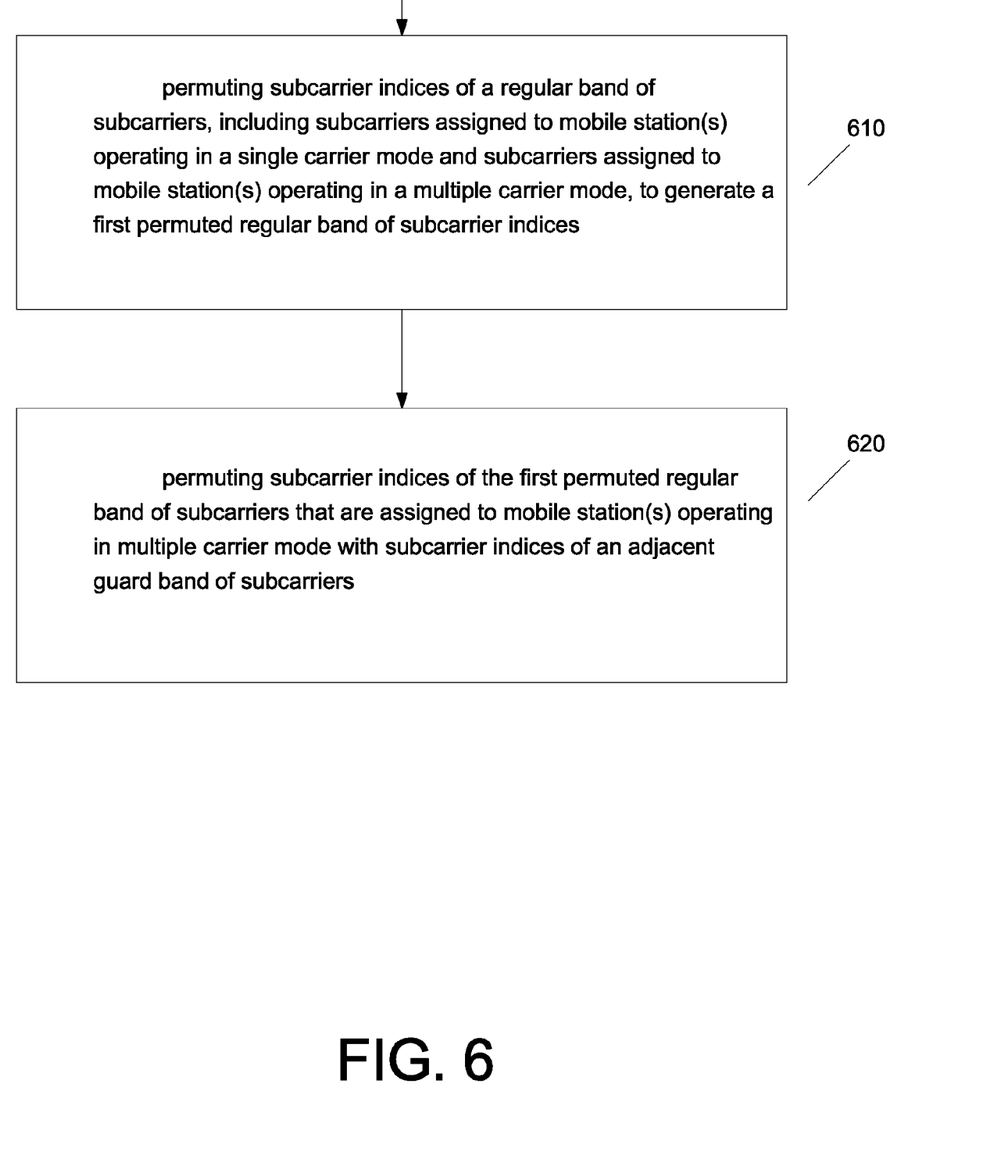
FIG. 6 is a flow chart illustrating operation of a wireless node according to another example embodiment.

FIG. 6 is a flow chart illustrating operation of a wireless node according to an example embodiment. The flow chart may be directed to a two-stage subcarrier index permutation for a wireless network. Operation 610 may include permuting subcarrier indices of a regular band of subcarriers, including subcarriers assigned to mobile station(s) operating in a single carrier mode and subcarriers assigned to mobile station(s) operating in a multiple carrier mode, to generate a first permuted regular band of subcarrier indices; and Operation 620 may include permuting subcarrier indices of the first permuted regular band of subcarriers that are assigned to mobile station(s) operating in multiple carrier mode with subcarrier indices of an adjacent guard band of subcarriers.

In an example embodiment, operation 610 may include permuting subcarrier indices within a first regular band of subcarriers to generate a first permuted regular band of subcarrier indices; and permuting subcarrier indices within a second regular band of subcarriers to generate a second permuted regular band of subcarrier indices, wherein a guard band of subcarriers is adjacent to both the first regular band of subcarriers and the second regular band of subcarriers, and wherein both the permuting subcarrier indices within the first regular band and the permuting subcarrier indices within the second regular band excludes the guard band subcarriers.

In an example embodiment, operation 620 may include permuting subcarrier indices of the guard band of subcarriers and subcarrier indices of both the first permuted regular band of subcarriers and the second permuted regular band of subcarriers that are assigned to mobile station(s) operating in multiple carrier mode.

The flow chart of FIG. 6 may further include renumbering the subcarrier indices of the second permuted regular band, e.g., to avoid a subcarrier index number conflict with the guard band and/or the first permuted regular band.

According to an example embodiment, an apparatus may include a processor configured to: permute subcarrier indices within a first regular band of subcarriers to generate a first permuted regular band of subcarrier indices; permute subcarrier indices within a second regular band of subcarriers to generate a second permuted regular band of subcarrier indices, wherein a guard band of subcarriers is adjacent to both the first regular band of subcarriers and the second regular band of subcarriers, and wherein both the permuting subcarrier indices within the first regular band and the permuting subcarrier indices within the second regular band excludes the guard band subcarriers; and permute subcarrier indices of the guard band of subcarriers and subcarrier indices of both the first permuted regular band of subcarriers and the second permuted regular band of subcarriers that are assigned to mobile station(s) operating in multiple carrier mode.

In an example embodiment, the processor may be further configured to renumber the subcarrier indices of the second permuted regular band to avoid a subcarrier index number conflict with the guard band and/or the first permuted regular band.

Figure 7:
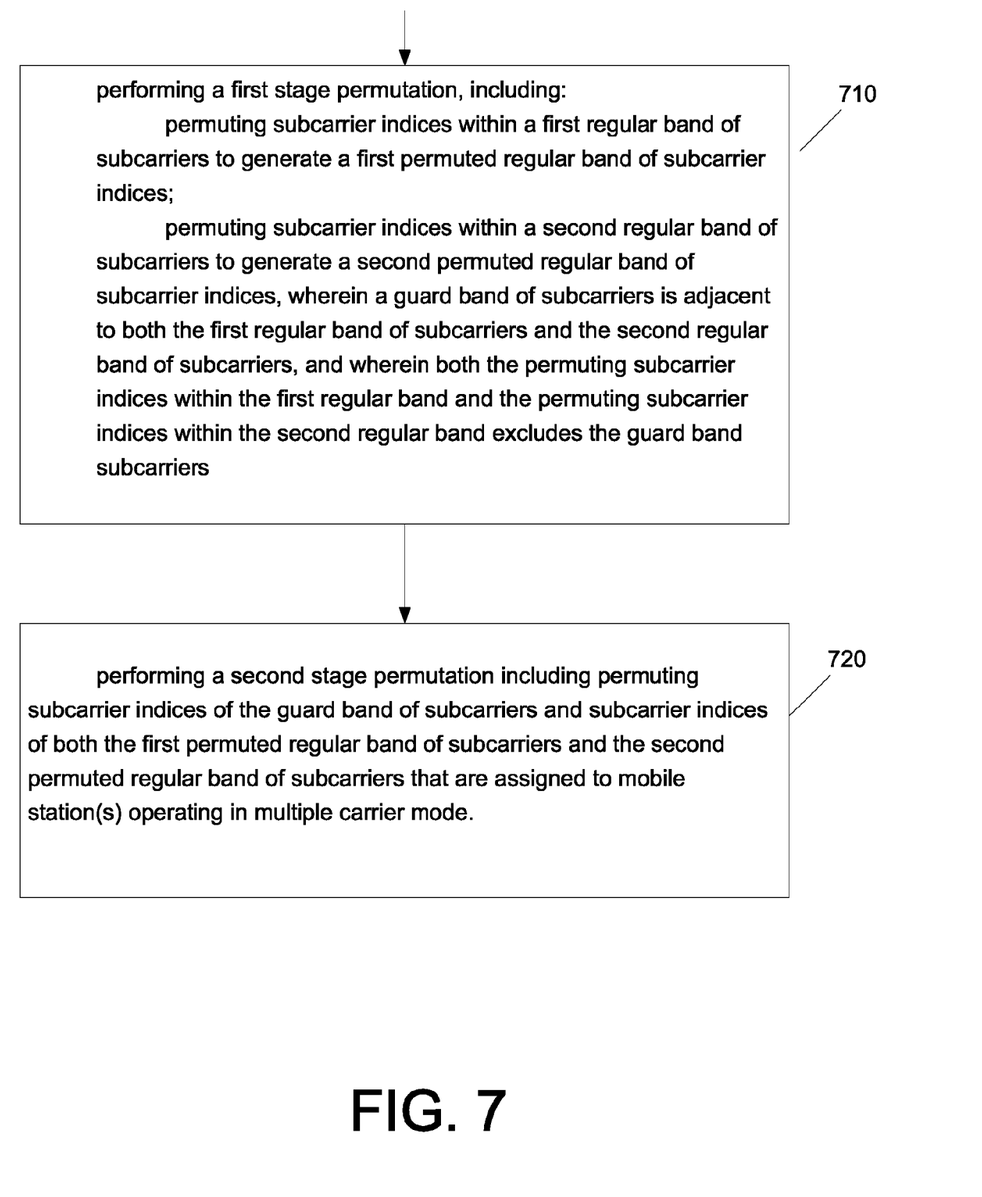
FIG. 7 is a flow chart illustrating operation of a wireless node according to another example embodiment.

FIG. 7 is a flow chart illustrating operation of a wireless node according to an example embodiment. Operation 710 may include permuting subcarrier indices within a first regular band of subcarriers to generate a first permuted regular band of subcarrier indices; permuting subcarrier indices within a second regular band of subcarriers to generate a second permuted regular band of subcarrier indices, wherein a guard band of subcarriers is adjacent to both the first regular band of subcarriers and the second regular band of subcarriers, and wherein both the permuting subcarrier indices within the first regular band and the permuting subcarrier indices within the second regular band excludes the guard band subcarriers.

Operation 720 may include performing a second stage permutation including permuting subcarrier indices of the guard band of subcarriers and subcarrier indices of both the first permuted regular band of subcarriers and the second permuted regular band of subcarriers that are assigned to mobile station(s) operating in multiple carrier mode.

The flow chat of FIG. 7 may further include renumbering the subcarrier indices of the second permuted regular band to avoid a subcarrier index number conflict with the guard band and/or the first permuted regular band.

The flow chart of FIG. 7 may further include sending a message (e.g., a MAP message broadcast by a BS to one or more MSs) to identify one or more of the subcarriers allocated to a mobile station operating in a multicarrier mode, the identified subcarriers including one or more subcarriers resulting from performing the second stage permutation.

Thus, one or more regular band subcarriers that were permuted in the second permutation stage and one or more guard band subcarriers, for example, may be allocated to a multicarrier MS.

Figure 8:
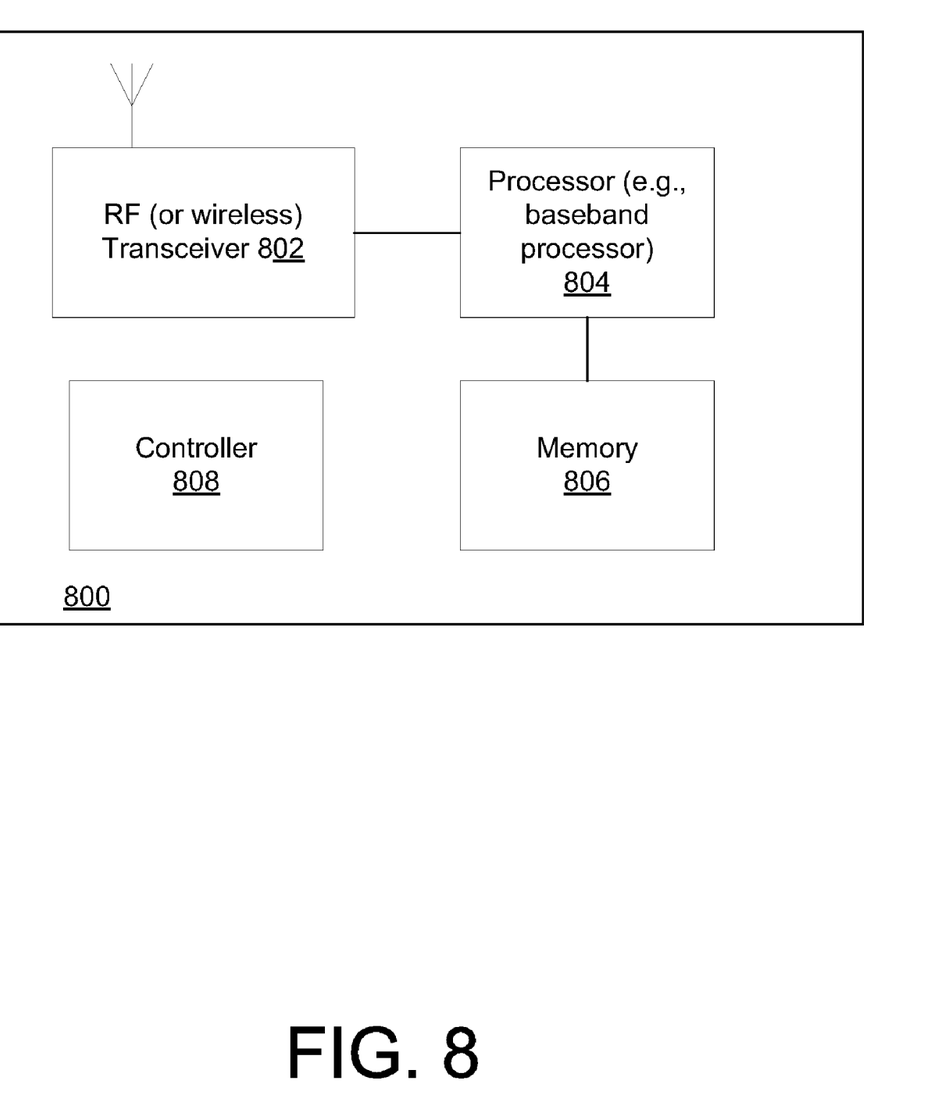
FIG. 8 is a block diagram of a wireless node according to an example embodiment.

FIG. 8 is a block diagram of a wireless station (or wireless node) 800 according to an example embodiment. The wireless station 800 (e.g., base station 104 or mobile station 106) may include, for example, an RF (radio frequency) or wireless transceiver 802, including a transmitter to transmit signals and a receiver to receive signals, a processor 804 to execute instructions or software and control transmission and receptions of signals, and a memory 806 to store data and/or instructions.

Processor 804 may also make decisions or determinations, generate frames or messages for transmission, decode received frames or messages for further processing, and other tasks, processing or functions described herein. Processor 804, which may be a baseband processor, for example, may generate messages, packets, frames or other signals for transmission via wireless transceiver 802. Processor 804 may control transmission of signals or messages over a wireless network, and may receive signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

Figure 9:
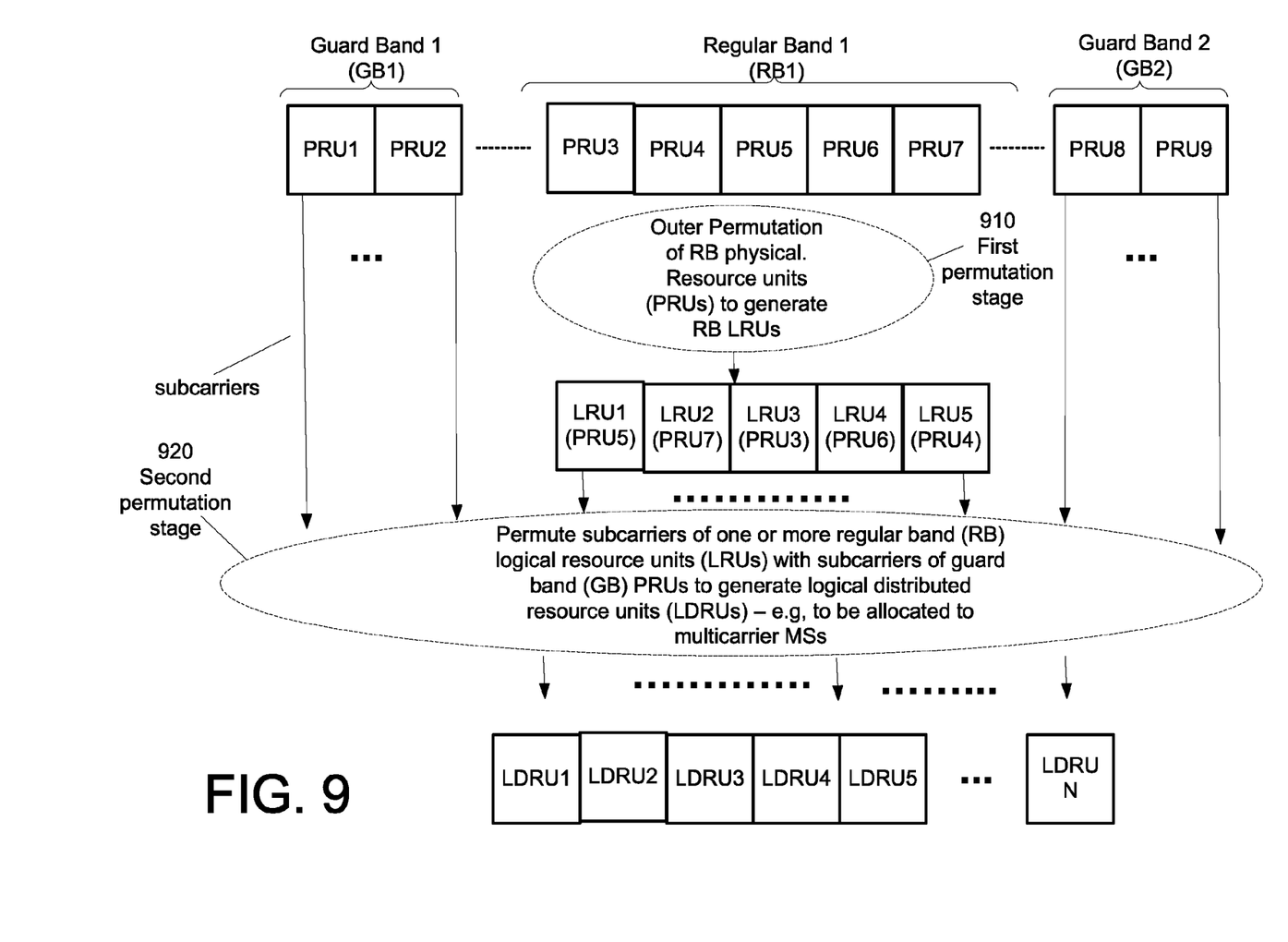
FIG. 9 is a diagram illustrating operation of a two-stage permutation according to another example embodiment.

FIG. 9 is a diagram illustrating operation of a two-stage permutation according to another example embodiment. Three bands are shown in FIG. 9, although any number may be provided. A first guard band (guard band 1 or GB1), a regular band 1 (RB1), and a second guard band (guard band 2 or GB2). Each band may include a number of subcarriers. For example, each guard band may include 90 subcarriers, and the regular band RB1 may include 844 subcarriers, for example. The subcarriers within each band may be grouped into one or more physical resource units (PRUs), which may include, for example, 18 subcarriers per PRU. Thus, for example, guard bands GB1 and GB2 may each include 5 PRUs, with 18 guard band subcarriers per PRU. Similarly, the subcarriers of the regular band RB1 may be grouped into a number of PRUs, e.g., 48 PRUs, with 18 regular subcarriers per PRU. These are merely example numbers of PRUs and subcarriers, and any numbers may be used. One or more of the regular band PRUs may be provided for a Fractional Frequency Reuse (FFR) group, which may be receive resources or subcarriers, e.g., either localize or distributed allocation. While FIG. 9 shows two PRUs (PRU1 and PRU2) for each guard band, and 5 PRUs (PRUs 3-7) for regular band RB1, these bands may include any number of PRUs.

An example of a two stage permutation shown in FIG. 9 will now be briefly described. At a first permutation stage 910, an outer permutation of regular band PRUs is performed to generate a group of regular band logical resource units (LRUs), including LRU1, LRU2, LRU3, LRU4 and LRU 5, etc. Thus, PRU5 may become LRU1, PRU7 may become LRU2, PRU3 may become LRU3, PRU6 may become LRU4, etc., as shown in FIG. 9, according to an example of the first permutation stage 910. In first permutation stage 910, the order or arrangement of regular band PRUs is altered or changed (permuted), but the subcarriers of such PRUs are not permuted. The permutation of regular band PRUs may increase frequency diversity for the resulting LRUs.

Next, a second permutation stage 920 is performed on the subcarriers of one or more regular band LRUs output from the first permutation stage and subcarriers of one or more PRUs of one or both guard bands (GB1, GB2). Thus, for example, subcarriers of one or more regular band LRUs may be permuted with the subcarriers of one or more guard band PRUs. For example, the subcarriers of the regular band LRUs may be permuted with the subcarriers of all of the guard band PRUs. Or the subcarriers of the regular band LRUs may be permuted with the subcarriers of one or more (or even all) of the PRUs of only one of the adjacent guard bands, e.g., permute subcarriers from regular band LRUs with subcarriers of one or both PRUs of guard band GB1. Or, for example, the subcarriers of a first subset of regular band LRUs (e.g., LRUs 3-5) may be permuted with the subcarriers of the PRUs of guard band GB1, while subcarriers of a second subset of regular band LRUs (e.g., LRUs 6-7) may be permuted with the subcarriers of the PRUs of guard band GB2. The second permutation stage 920 may output one or more logical distributed resource units (LDRUs), which may be allocated to one or more multicarrier MSs, for example, or used for transmission to a multicarrier MS.

According to one example embodiment, a single carrier MS (a MS operating in single carrier mode) may use only the regular band subcarriers (and does not typically use subcarriers from the guard bands), while a multicarrier MS (MS operating in multicarrier or multiple carrier mode) may use subcarriers from both the regular band RB1 and one or both guard bands (GB1 and/or GB2).

A processor (e.g., processor 804, such as a baseband processor) may generate a message for transmission, such as a MAP message, to be transmitted or broadcast to one or more MSs, to identify LDRUs or subcarriers of the LDRUs that are being allocated (or have been allocated or assigned) to one or more multicarrier MSs. The message (identifying one or more subcarriers allocated for UL or DL transmission to a multicarrier MS(s)) may be transmitted by the BS to one or more MSs, e.g., by wireless transceiver 802, e.g., under control of the processor 804, for example.

For example, after the regular band PRUs are permuted via the first stage permutation 910, a first subset of the regular band LRUs may be allocated for single carrier MSs (e.g., LRUs 1-3), and a second subset (e.g., LRUs 4-5) of the regular band LRUs may be allocated to multicarrier MSs. In such case, only the subset of LRUs allocated to multicarrier MSs would be permuted (their subcarriers permuted) with one or more guard band subcarriers in the second permutation stage 920. The regular band subcarriers allocated to single carrier MSs would not be permuted in the second permutation stage 920, for example. Thus, in such case, some of the regular band resources remain separate from the guard band resources, to be used by the single carrier MSs, while other regular band subcarriers may be permuted with guard band subcarriers to, e.g., increase capacity or increase available resources for the multicarrier MSs.

According to an example embodiment, a method may include permuting a plurality of regular band physical resource units to generate a plurality of logical resource units; permuting subcarriers of one or more of the regular band logical resource units with subcarriers of one or more guard band physical resource units to generate one or more logical distributed resource units; and sending a message to allocate one or more of the logical distributed resource units to one or more mobile stations operating in a multicarrier mode.

In an example embodiment, the permuting subcarriers may include permuting subcarriers of one or more of the regular band logical resource units with subcarriers of a plurality of guard band physical resource units to generate one or more logical distributed resource units.

In an example embodiment, the permuting subcarriers may include permuting subcarriers of a first subset of the regular band logical resource units with subcarriers of one or more guard band physical resource units of a first guard band; and permuting subcarriers of a second subset of the regular band logical resource units with subcarriers of one or more guard band physical resource units of a second guard band.

According to another example embodiment, an apparatus may include a processor. The processor may be configured to: permute a plurality of regular band physical resource units to generate a plurality of logical resource units; permute subcarriers of one or more of the regular band logical resource units with subcarriers of one or more guard band physical resource units to generate one or more logical distributed resource units; and generate a message for transmission to allocate one or more of the logical distributed resource units to one or more mobile stations operating in a multicarrier mode.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
a processor configured to:
permute subcarrier indices of a regular band of subcarriers, including subcarriers assigned to mobile station(s) operating in a single carrier mode and subcarriers assigned to mobile station(s) operating in a multiple carrier mode, to generate a first permuted regular band of subcarrier indices;
permute subcarrier indices of the first permuted regular band of subcarriers that are assigned to mobile station(s) operating in multiple carrier mode with subcarrier indices of an adjacent guard band of subcarriers to generate a set of physical subcarrier indices.

2. The apparatus of claim 1 wherein the processor being configured to permute subcarrier indices of the first permuted regular band of subcarriers that are assigned to mobile station(s) operating in multiple carrier mode with subcarrier indices of an adjacent guard band of subcarriers comprises the apparatus being configured to:
place guard band subcarriers at subcarrier locations or subcarrier indices at a regular interval or spacing of subcarriers; and
place subcarriers of the first permuted regular band at subcarrier locations or subcarrier indices not taken by the guard band subcarriers.

3. The apparatus of claim 1 wherein the processor being configured to permute subcarrier indices of the first permuted regular band of subcarriers that are assigned to mobile station(s) operating in multiple carrier mode with subcarrier indices of an adjacent guard band of subcarriers comprises the apparatus being configured to:
place guard band subcarriers at subcarrier locations or subcarrier indices at a regular interval or spacing of subcarriers based on the ratio of N/M, where N is a number of subcarriers in the first permuted regular band that are assigned to mobile station(s) operating in the multiple carrier mode and M is a number of guard band subcarriers; and
place subcarriers of the first permuted regular band at subcarrier locations or subcarrier indices not taken by the guard band subcarriers.

4. The apparatus of claim 3 wherein the processor being configured to place guard band subcarriers at subcarrier locations or subcarrier indices comprises the processor being configured to place guard band subcarriers at subcarrier locations or subcarrier indices at a regular interval or spacing of $(\lambda+1)$ subcarriers, where $\lambda=N/M$, where N is a number of subcarriers in the first permuted regular band that are assigned to mobile station(s) operating in the multiple carrier mode and M is a number of guard band subcarriers.

5. The apparatus of claim 2 wherein the processor being configured to permute subcarrier indices of the first permuted regular band of subcarriers that are assigned to mobile station(s) operating in multiple carrier mode with subcarrier indices of an adjacent guard band of subcarriers comprises the apparatus being configured to:
place guard band subcarriers at subcarrier locations or subcarrier indices at a regular interval or spacing of subcarriers based on $s_{(\lambda+1)\times m}=g_m$, m=0, 1, ..., M−1, where s are the resulting permuted subcarrier indices, $\lambda=N/M$, where N is a number of subcarriers in the first permuted regular band that are assigned to mobile station(s) operating in the multiple carrier mode and M is a number of guard band subcarriers, and $g_m$ are the guard band subcarriers; and
place subcarriers of the first permuted regular band at subcarrier locations or subcarrier indices not taken by the guard band subcarriers based on $s_i=p_n$, i=1, 2, ..., $\lambda$, $\lambda+2$, ..., $2\lambda+1$, $2\lambda+3$, ..., T−1, n=0, 1, ..., N−1, where s are the resulting permuted subcarrier indices, and p are the subcarrier indices of subcarriers assigned to mobile station(s) operating in multiple carrier mode of the first permuted regular band of subcarriers.

6. The apparatus of claim 2 wherein the processor is further configured to generate a message for wireless transmission that allocates one or more subcarriers to a mobile station from the set physical subcarrier indices.

7. The apparatus of claim 2 wherein the processor is further configured to transmit or receive data via wireless transmission via one or more subcarriers based on the set physical subcarrier indices.

8. A method of two-stage subcarrier index permutation for a wireless network, the method comprising:
permuting, by a processor, subcarrier indices of a regular band of subcarriers, including subcarriers assigned to mobile station(s) operating in a single carrier mode and subcarriers assigned to mobile station(s) operating in a multiple carrier mode, to generate a first permuted regular band of subcarrier indices; and permuting subcarrier indices of the first permuted regular band of subcarriers that are assigned to mobile station(s) operating in multiple carrier mode with subcarrier indices of an adjacent guard band of subcarriers.

9. The method of claim 8 wherein the permuting subcarrier indices of a regular band of subcarriers comprises:

permuting subcarrier indices within a first regular band of subcarriers to generate a first permuted regular band of subcarrier indices; and permuting subcarrier indices within a second regular band of subcarriers to generate a second permuted regular band of subcarrier indices, wherein a guard band of subcarriers is adjacent to both the first regular band of subcarriers and the second regular band of subcarriers, and wherein both the permuting subcarrier indices within the first regular band and the permuting subcarrier indices within the second regular band excludes the guard band subcarriers.

10. The method of claim 9 wherein the permuting subcarrier indices of the first permuted regular band comprises:

permuting subcarrier indices of the guard band of subcarriers and subcarrier indices of both the first permuted regular band of subcarriers and the second permuted regular band of subcarriers that are assigned to mobile station(s) operating in multiple carrier mode.

11. The method of claim 10 and further comprising renumbering the subcarrier indices of the second permuted regular band to avoid a subcarrier index number conflict with the guard band and/or the first permuted regular band.

12. An apparatus comprising a processor, the processor configured to:

permute subcarrier indices within a first regular band of subcarriers to generate a first permuted regular band of subcarrier indices;

permute subcarrier indices within a second regular band of subcarriers to generate a second permuted regular band of subcarrier indices, wherein a guard band of subcarriers is adjacent to both the first regular band of subcarriers and the second regular band of subcarriers, and wherein both the permuting subcarrier indices within the first regular band and the permuting subcarrier indices within the second regular band excludes the guard band subcarriers; and permute subcarrier indices of the guard band of subcarriers and subcarrier indices of both the first permuted regular band of subcarriers and the second permuted regular band of subcarriers that are assigned to mobile station(s) operating in multiple carrier mode.

13. The apparatus of claim 12 and wherein the processor is further configured to renumber the subcarrier indices of the second permuted regular band to avoid a subcarrier index number conflict with the guard band and/or the first permuted regular band.

14. A method comprising:

performing, by a processor, a first stage permutation, including:

permuting subcarrier indices within a first regular band of subcarriers to generate a first permuted regular band of subcarrier indices;

permuting subcarrier indices within a second regular band of subcarriers to generate a second permuted regular band of subcarrier indices, wherein a guard band of subcarriers is adjacent to both the first regular band of subcarriers and the second regular band of subcarriers, and wherein both the permuting subcarrier indices within the first regular band and the permuting subcarrier indices within the second regular band excludes the guard band subcarriers; and performing a second stage permutation including permuting subcarrier indices of the guard band of subcarriers and subcarrier indices of both the first permuted regular band of subcarriers and the second permuted regular band of subcarriers that are assigned to mobile station(s) operating in multiple carrier mode.

15. The method of claim 14 and further comprising renumbering the subcarrier indices of the second permuted regular band to avoid a subcarrier index number conflict with the guard band and/or the first permuted regular band.

16. The method of claim 14 and further comprising transmitting or sending a message to identify the subcarriers allocated to a mobile station operating in a multicarrier mode, the identified subcarriers including one or more subcarriers resulting from performing the second stage permutation.

17. A method comprising:

permuting, by a processor, a plurality of regular band physical resource units to generate a plurality of logical resource units; and permuting subcarriers of one or more of the regular band logical resource units with subcarriers of one or more guard band physical resource units to generate one or more logical distributed resource units; and sending a message to allocate one or more of the logical distributed resource units to one or more mobile stations operating in a multicarrier mode.

18. The method of claim 17 wherein the permuting subcarriers comprises:

permuting subcarriers of one or more of the regular band logical resource units with subcarriers of a plurality of guard band physical resource units to generate one or more logical distributed resource units.

19. The method of claim 17 wherein the permuting subcarriers comprises:

permuting subcarriers of a first subset of the regular band logical resource units with subcarriers of one or more guard band physical resource units of a first guard band; and permuting subcarriers of a second subset of the regular band logical resource units with subcarriers of one or more guard band physical resource units of a second guard band.

* * * * *